United States Patent [19]

Rundle

[11] Patent Number: 4,658,662

[45] Date of Patent: Apr. 21, 1987

[54] TRANSMISSION AND PTO SYSTEM FOR TRACTORS AND UTILITY CYCLES

[76] Inventor: Kenneth P. Rundle, 8304 Brookside Rd., Independence, Ohio 44131

[21] Appl. No.: 867,939

[22] Filed: May 29, 1986

Related U.S. Application Data

[63] Continuation-in-part of Ser. No. 600,846, Apr. 16, 1984, abandoned.

[51] Int. Cl.$^4$ .............................................. F16H 3/08
[52] U.S. Cl. ......................................... 74/331; 74/15.2; 74/15.6; 74/333; 74/344; 74/357; 74/359
[58] Field of Search ................ 74/11, 15.6, 5.66, 333, 74/331, 342, 344, 357–363, 700, 15.2

[56] References Cited

U.S. PATENT DOCUMENTS

| | | | |
|---|---|---|---|
| 2,448,662 | 9/1948 | Dale | 74/15.6 X |
| 2,552,765 | 5/1951 | Bixby et al. | 74/342 X |
| 2,647,596 | 8/1953 | Cook | 74/333 X |
| 2,727,479 | 4/1973 | Wilson | 74/360 X |
| 2,946,238 | 7/1960 | Beyerstedt | 74/700 X |
| 3,115,049 | 12/1963 | Moan | 474/18 X |
| 3,204,468 | 9/1965 | Ruoff | 74/15.2 X |
| 3,465,609 | 9/1969 | Fisher et al. | 74/360 |
| 4,262,768 | 4/1981 | Itatani et al. | 74/15.6 X |
| 4,341,127 | 7/1982 | Stodt | 74/360 X |
| 4,392,391 | 7/1983 | Jameson et al. | 74/333 |

FOREIGN PATENT DOCUMENTS

| | | | |
|---|---|---|---|
| 2916112 | 10/1979 | Fed. Rep. of Germany | 74/331 |
| 72631 | 5/1980 | Japan | 74/331 |
| 1208695 | 10/1970 | United Kingdom | 74/331 |

Primary Examiner—Leslie Braun
Assistant Examiner—Dwight G. Diehl

[57] ABSTRACT

A speed change transmission is shown in variation having an extremely wide range of selectively engageable speed drive ratios for use with garden tractors and utility cycles with tractor mode. The transmission also serves as a speed range transmission for use with a hydrostatic transmission in a garden tractor. In variation the transmission is shown with a new two speed PTO systme featuring selectively engageable rear, middle and front outputs. The transmissions and PTO system are extremely compact by virtue of an unique creep speed reduction train, a simplified constant mesh shift means, a PTO shaft journalled coaxially within a hollow transmission mainshaft and a minimum number of components arranged and adapted so that many serve multiple functions.

10 Claims, 7 Drawing Figures

FIG.1

TRANSMISSION AND PTO SYSTEM FOR TRACTORS AND UTILITY CYCLES

This application is a CONTINUATION-IN-PART of the copending application Ser. No. 600,846 filed Apr. 16, 1984, now abandoned entitled "TRACTOR TRANSMISSION AND PTO DRIVE" and now abandoned.

This invention relates to a gear type transmission that provides a number of speed drives between two shafts that effectively covers an extreme range of ratios.

A unique creep speed reduction train employs first and second intermeshing gearsets to provide first and second speed drives respectively. A third intermeshing gearset disposed between said first and second gearsets is used to provide a third speed drive having a reduction ratio equal to the multiplicative product of the ratios of all three gearsets. A unique shift means uses the second gearset as sliding clutch collars to engage all three speed drives and an optional fourth speed drive comprised of a fourth intermeshing gearset.

A fifth intermeshing gearset and a nonreversing drive are also included in variations to provide fifth and reverse speed drives. Wherein said fifth and reverse speed drives have reduction ratios equal to the product of their respective ratios multiplied by the product of said first and third gearset ratios.

The transmission is advantageously applied to small gear drive tractors to eliminate a separate range transmission and to small hydrostatic drive tractors to provide two or three widely spaced speed ranges.

The transmission is also shown for use with all terrain vehicle (ATV) sport utility cycles having three or four wheels to provide these cycles with a number of very slow work speeds including a safe slow reverse speed so that these cycles will better function as small tractors in a tractor mode.

In variation the transmission is shown with a primary reduction clutch section that features separate clutched inputs to the transmission and to an advanced PTO system.

The PTO system employs the primary reduction gearing of the speed transmission input to provide a second PTO speed so that work tool attachments designed for both garden tractors and somewhat larger tractors may be used on a tractor featuring the new PTO system.

The PTO drive shaft passes rearwardly and coaxially through the hollow transmission mainshaft to a rear PTO output and extends forwardly from the clutch section housing to shaft drive a forward PTO transfer case having front and middle PTO outputs, thus avoiding the cost and complexity of separate front, middle and rear PTO clutches and driving elements.

BACKGROUND OF THE INVENTION

Currently a hydrostatic drive garden tractor employs a final drive differential and basic design that is shared with the gear drive tractors of that manufacturer. The hydrostatic models feature an independent rear PTO. The gear drive models employ a drive clutch at the engine and a range transmission ahead of the speed transmission so that the independent rear PTO may not be employed.

The new invention places the drive clutch in the transaxle at the primary reduction section and replaces the separate range transmission with two additional, more desirable creep speeds in the main transmission so that the gear drive models may employ the very same rear PTO system currently available only with hydrostatic drive and so that hydro and gear models may share additional components and assembly to further reduce cost.

Currently many hydrostatic drive tractors feature a single range of speeds. When these tractors include a second speed range, typically design limitations dictate that this second speed be a faster transport speed somewhat closely related to the slower speed so that there is no real improvement in creep speed performance as when snow blowing or rototilling.

The present invention greatly enhances the efficient operation of a hydrostatic drive tractor by providing both a faster and a slower range of speeds. The two additional speeds only require that two additional gearsets be added to a present single range tractor. The slow speed enjoys the multiplied reduction of three gearsets for positive control creep speed. A safety neutral is also provided.

Currently some gear drive tractors employ an auxiliary range transmission to provide a number of creep slow work speeds. The disadvantages of which are:

1. A lack of inherent safety; garden tractors are largely operated by nonprofessionals with little understanding of torque multiplication principles and means. The concept of first, second, third has automotive precedent; but the concept of third low and third high has little meaning.
2. Cumbersome creep engagement requires the movement of two gearshift levers.
3. Additional unnecessary speeds, i.e. creep reverse and nearly redundant top speed low.
4. Poor forward/reverse shuttle operation from creep forward to normal reverse.
5. Often the range transmission will also reduce a rear PTO speed.
6. Excessive costs.

Currently other gear drive garden tractors include a creep speed gear train within the primary transmission. The disadvantages of which as heretofore utilized include:

1. The need to pass the gearshift lever through a normal speed to engage creep and the associated cumbersome reverse shuttle function.
2. Utilization of a sliding gear to engage creep with inherent weakness and gear clashing.
3. An additionally required reduction support shaft.
4. Excessive costs.

These disadvantages are overcome by the new invention wherein a primary transmission creep speed utilizes the gearsets of two normal speeds to contribute to the creep speed reduction. There are no dangerously small pinions and all gearsets are in constant mesh so that sintered metal may be used to reduce cost. There are no speed increasing drives requiring costly additional reduction elsewhere in a transaxle. The shift means are comprised primarily of the gearsets themselves and no separate lay shafts are required. All speeds are engaged with a familiar H pattern movement of the single gearshift lever with reverse located opposite a convenient forward speed.

Concerning a PTO system, currently few garden tractors feature a category O rear PTO as suggested by the ASAE, American Society of Agricultural Engineers, so that owners of these tractors may not utilize standardized implements available. Also, there has been no real progress in the standardization of front and middle mounted work tools so that driven attachments designed for a certain model tractor may not be used with any other make or model.

The new invention shows a front middle and rear PTO system that makes all three outputs available at reasonable cost and suggests a format for standardization of front and middle implements.

Furthermore, a controversy exists over the proclaimed "too fast" 2000 rpm ASAE proposed garden tractor rear PTO speed and the also proclaimed "too slow" 540 rpm ASAE compact tractor standard. The present invention shows a tractor featuring both PTO speeds at little cost to utilize implements designed for garden and compact tractors alike.

Concerning ATV cycles and their use as small tractors, the new invention is shown to enhance their performance and extend their application in tractor mode.

Currently some of these cycles are being fit with work tools such as lawn mowers. Typically the cycle is operated in a lowest transmission speed at a low engine speed to hold a reasonable and effective work speed.

The new invention is shown in a variation to provide two extreme reduction work speeds and a safe reverse speed within the primary transmission. A second variation shows a separate range transmission employing the new invention to provide extreme reduction work speeds.

The slow work speeds will prevent accidental fast run away of a cycle with a separately powered mower in operation.

SUMMARY OF THE INVENTION

The primary intent of this invention is to provide affordable sophistication to garden tractors that is not transferable from small agricultural tractors and riding lawnmowers.

A first object of the invention is to show a transmission with a unique creep speed reduction arrangement.

A second object is to show said transmission and said reduction arrangement with a uniquely simple shift means.

A third object is to show a transmission with an advanced PTO system featuring PTO drive outputs at the rear, middle and front of a tractor.

A fourth object is to show said transmission with said PTO system wherein a primary reduction transmission input gearset is also employed to provide a second PTO speed.

BRIEF DESCRIPTION OF THE DRAWINGS

The invention will be described by way of example, with reference to the accompanying drawings, in which:

FIGS. 1-6 are longitudinal section right side views along a vertical cutting plane that bisects the centerline of all shafts shown in which:

FIG. 1 represents a five speed and reverse transaxle for a gear drive garden tractor.

FIG. 2 represents a three speed and reverse transaxle with two speed PTO system for a gear drive garden tractor.

FIG. 3 represents a two or three speed range transmission for a hydrostatic drive garden tractor.

FIG. 4 represents a five speed and slow reverse transmission for an ATV cycle with tractor mode.

FIG. 5 represents a two speed and reverse range transmission for an ATV cycle with tractor mode.

FIG. 6 represents a forward PTO transfer case to interconnect with the transaxle of FIG. 2 to complete the PTO system.

Figure 2:
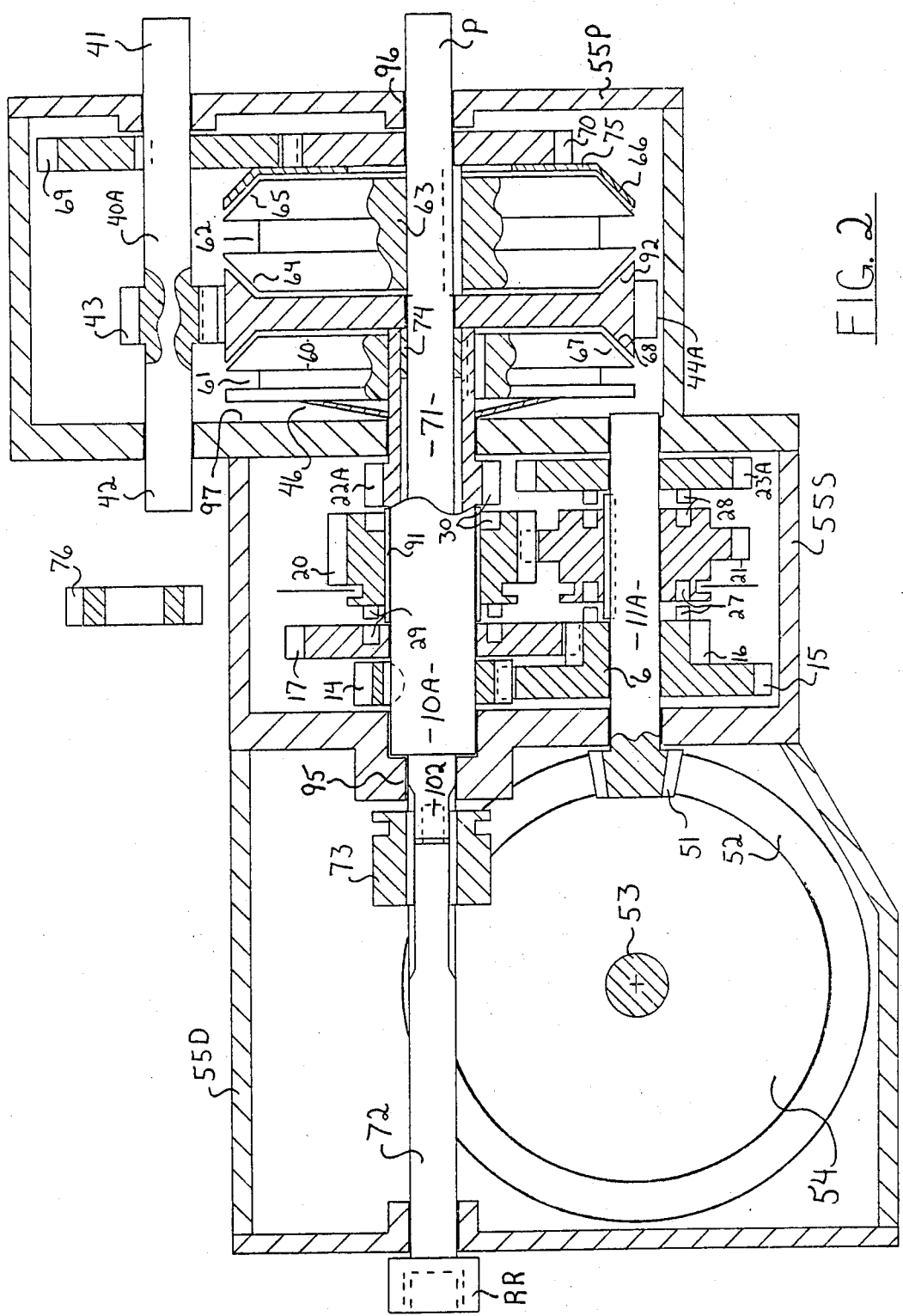

A direction to the right of all figures is referred to as forward or forwardly.

DESCRIPTION OF DRAWING ONE

Figure 1:
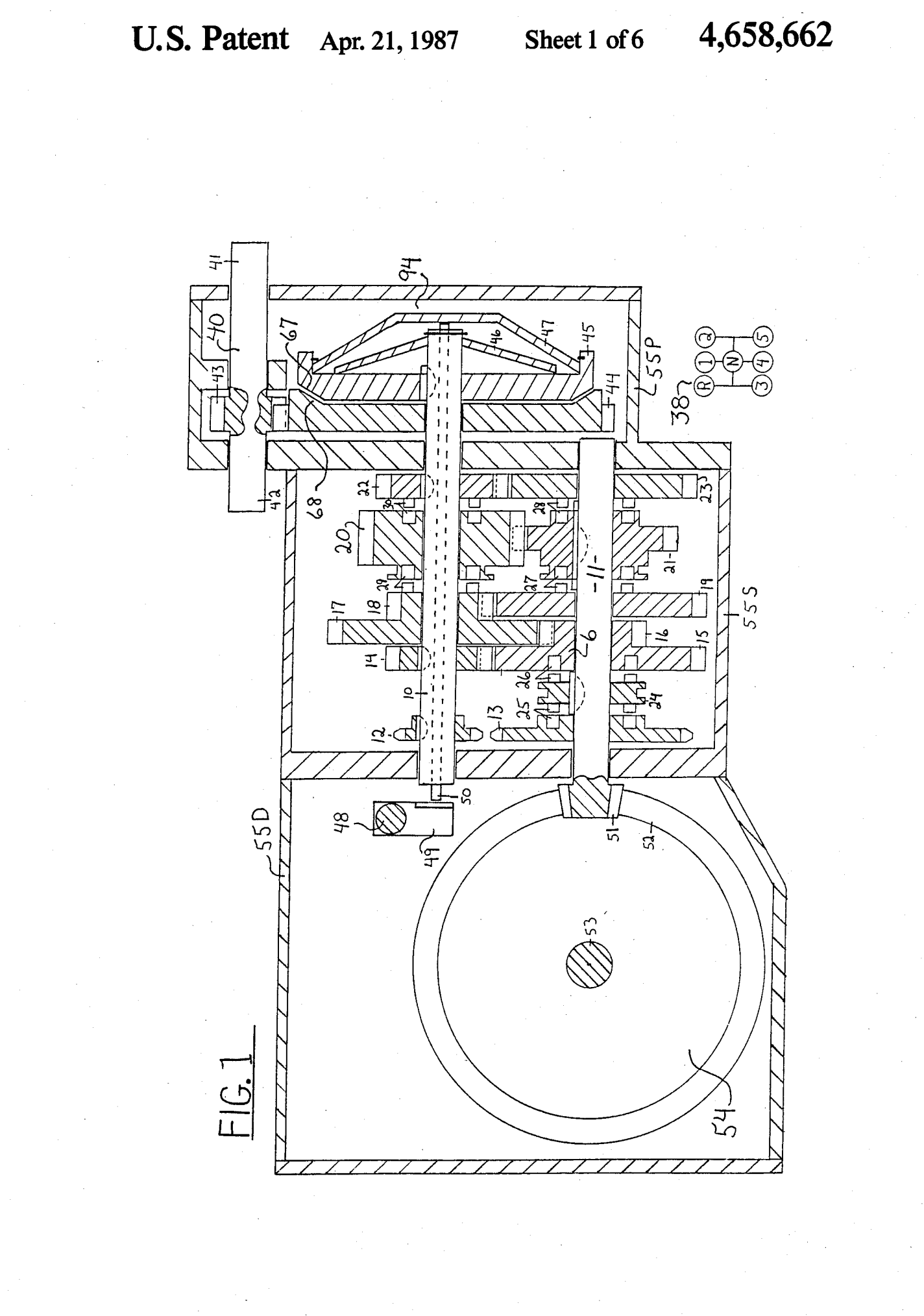

Referring to FIG. 1, This five speed and reverse transaxle for a garden tractor combines a primary reduction clutch section 55P, a constant mesh gear speed transmission section 55S and a final drive differential section 55D to form the entire transaxle support and enclosure housing. Each section has interconnecting passages to share a common lubricating oil level.

A primary input shaft 40, journalled in housing section 55P, receives an unclutched drive from an internal combustion engine at 41 as described with reference to FIG. 7.

Primary pinion 43, made part of shaft 40, drives primary gear 44, rotatable on transmission input mainshaft 10, journalled in housing section 55S. Primary gear 44 includes a bevelled face 68 to serve as the input member to a wet friction cone clutch.

Cone clutch output 45, keyed to and slidable axially on mainshaft 10, is urged to the left by bellville spring 46 so that a bevelled face 67 forceably contacts face 68 to pass a line of drive to mainshaft 10. A release cover 47 is secured to output 45.

A pivot shaft 48, journalled transversely in housing section 55D, ends outside with a lever linked to a clutch pedal. Clutch rod 50 passes axially through hollow mainshaft 10. When the clutch pedal is depressed, release arm 49, secured to shaft 48, forces rod 50 to push release cover 47 and output 45 away from gear 44 to release the clutch.

The cone clutch and gear 44 are economically manufactured of sintered metal and readily serviced in the tractor chassis. The release means is located at the housing section 55D away from the congested tractor mid section. The cone clutch has a large diameter for capacity and operates in oil for assured smooth engagement. A simple friction disc at 94 will provide a clutch brake to enhance transmission shifting.

A typically motorcycle type multi-plate disc clutch may well replace the cone clutch shown and retain the release means and suggested clutch brake at 94.

A transmission output countershaft 11 is journalled in housing section 55S. A drive is passed from the input mainshaft 10 to the output countershaft 11 at a number of ratios to provide for five forward and one reverse speeds with two of the drives being of extreme reduction ratio to provide creep and super creep forward speeds.

Reverse drive sprocket 12 keyed to mainshaft 10 drives reverse driven sprocket 13 rotatable on countershaft 11 with a chain (not shown).

Third pinion 14, keyed to mainshaft 10, meshes with third gear 15 rotatable in countershaft cluster 6 with transfer pinion 16 on countershaft 11.

Transfer pinion 16 meshes with transfer gear 17 rotatable in mainshaft cluster with first pinion 18 on mainshaft 10.

First pinion 18 meshes with first gear 19 rotatable on countershaft 11.

Second and fifth pinion 20, rotatable on mainshaft 10, meshes constantly with second and fifth gear 21 keyed to countershaft 11. Both the pinion 20 and the gear 21 are slidable axially when motivated by separate shift forks (not shown).

Fourth pinion 22 keyed to mainshaft 10 meshes with fourth gear 23 rotatable on countershaft 11.

Dog clutch shift collar 24, slidably supported on and keyed to countershaft 11, slides axially when motivated by a third shift fork (not shown).

The three shift forks are interconnected by suitable linkage to a single control lever, outside, movable in the popular H-shift pattern 38.

When collar 24 is moved to the left, a dog clutch 25 engages driven sprocket 13 to establish a reverse speed.

When collar 24 is moved to the right, a dog clutch 26 engages third gear 15 to establish a third speed.

When second and fifth pinion 20 is moved to the left, a dog clutch 29 engages first pinion 18 to establish a second speed of extreme ratio.

When second and fifth pinion 20 is moved to the right, a dog clutch 30 engages fourth pinion 22 to establish a fifth speed.

When second and fifth gear 21 is moved to the left, a dog clutch 27 engages first gear 19 to establish a first speed of greater extreme reduction ratio.

When second and fifth gear 21 is moved to the right, a dog clutch 28 engages fourth gear 23 to establish a fourth speed.

This single lever five speed offers every usable speed that a two range six speed offers without the ratio compromises, redundancies, or disadvantages of a two lever drive.

The constant mesh H-shift remains the best arrangement for Garden Tractor applications involving severe service.

The "super creep" first speed is especially desirable when the tractor is fitted with a reverse rotation tiller or wide snow blower while the "creep" second speed is convenient when operating these work tools in less demanding conditions.

The transaxle as drawn in FIG. 1 provides the following travel speeds at full engine speed:
FIRST: 0.4 mph
SECOND: 1.0 mph
THIRD: 2.5 mph
FOURTH: 3.9 mph
FIFTH: 6.3 mph
REVERSE: 2.5 mph
Somewhat larger compact tractors will utilize these same ratios to provide speeds 80–100% faster than those given here. The range of speeds will remain the same.

When the first speed gearset 18, 19 is removed from the mainshaft cluster to be driven by the mainshaft proper, an additional mowing speed is provided. Gear 21 and dog clutch 27 would then engage gear 16. Collar 24 and dog clutch 26 would then engage the relocated gear 19.

Figure 4:
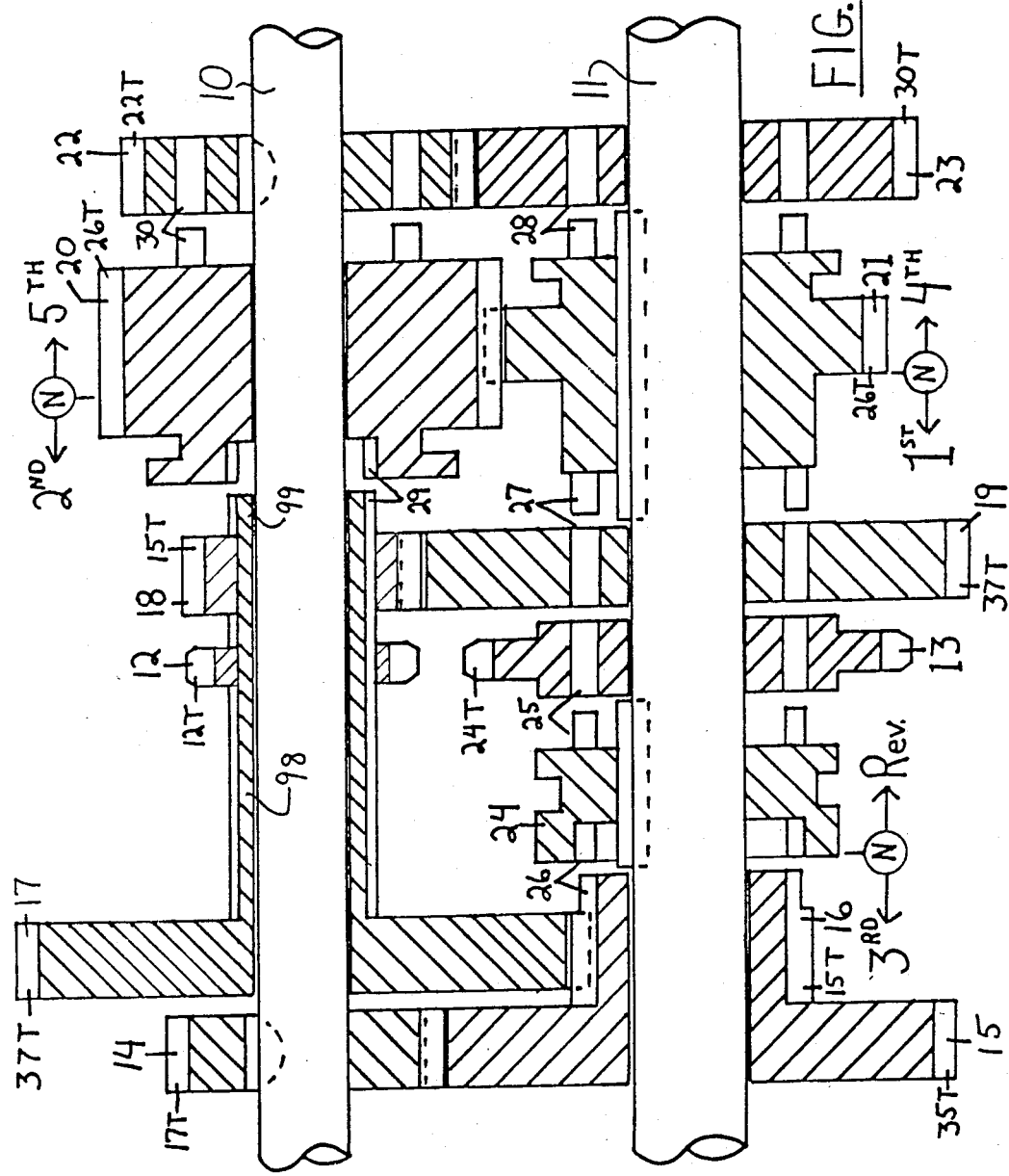

A non-reversing drive may be driven from the mainshaft cluster adjacent to or in place of first speed gearset 18, 19 to provide a reverse speed of greater reduction as shown with reference to FIG. 4.

The economy of construction is apparent as five gearsets provide for five speeds despite the fact that the first and second speeds each require three gearsets in their trains.

Large pinions assure capacity and the use of no overdrive ratios will decrease needed reduction elsewhere in a transaxle. Constant meshing assures shift quality and durability so that sintered metal may be used throughout. All numbers followed by T indicate numbers of gear teeth.

The H-shift pattern is easily memorized and reverse is located opposite a desirable forward speed for convenient shuttle. In-line shift is available without decrease in torque capacity as these shift means (described with reference to FIG. 4) involve only the motivation of the three shift forks. Pointed fine tooth clutch dogs are used when in-line shift is specified to engage without hesitation or alignment of dogs.

There are to be no snap rings on any torqued section of countershaft 11 and mainshaft 10. The keys will separate the gears on countershaft 11. Pinion 20 will rotate and slide on a sleeve (91 FIG. 2) that separates pinion 22 and cluster 17, 18. Snap ring grooves would produce stress concentrations.

A typically automotive differential 54 and a pair of coaxial output axle shafts 53 are journalled laterally in the differential housing section 55D. The axle shafts 53 extend outside laterally to carry the tractor drive wheels. Countershaft 11 includes a bevel pinion 51 meshing with a bevel ring gear 52 secured to differential 54 to complete the drive train.

A double reduction final drive as typified by drop axles and "bull" spur gears will advance the transaxle to larger utility tractors.

Primary input shaft 40 has a rearward extension 42 to drive the "live" and completely independent rear PTO system currently employed with hydrostatic drive garden tractors only. A hydraulic pump may also be driven by shaft 40 outside at 42.

DESCRIPTION OF DRAWING TWO

Referring to FIG. 2 primarily, This three speed and reverse transaxle for a small tractor combines a primary reduction clutch section 55P, a constant mesh gear speed transmission section 55S and a final drive differential section 55D to form the entire support and enclosure housing. Each section has interconnecting passages to share a common lubricating oil level. A PTO system has been integrated within this transaxle featuring two PTO speeds (540 and 2000 rpm typically) and cone clutching to selectively engage the desired PTO speed.

A primary input shaft 40A, journalled in housing section 55P, receives an unclutched input at 41 from an internal combustion engine as described with reference to FIG. 7.

Hollow transmission input mainshaft 10A is journalled in housing section 55S. A PTO drive shaft 71 passes coaxially and entirely through mainshaft 10A to be journalled in housing section 55S at 95 and in housing section 55P a 96 and additionally in the mainshaft 10A at 74.

Primary pinion 43, made part of shaft 40A, drives primary gear 44A, rotatable on PTO drive shaft 71.

Primary gear 44A includes a bevelled face 68 to serve as the input member to a 'wet' friction transmission cone clutch.

Transmission cone clutch output 60, keyed to and slidable axially on mainshaft 10A, is urged to the right by bellville spring 46 so that a bevelled face 67 forceably contacts face 68 to pass a line of drive from gear 44A to mainshaft 10A. Typically a shift fork (not shown) will engage a groove 61 in output 60 and be interconnected with a clutch pedal. When said clutch pedal is depressed said fork will force clutch output 60 away from gear 44A to interrupt the line of drive. A simple friction pad at 97 will provide a clutch brake to enhance transmission shifting.

A transmission output countershaft 11A is journalled in housing section 55S. A drive is passed from mainshaft 10A to countershaft 11A at four ratios to provide for three forward and one reverse speeds with one drive being of extreme reduction ratio to provide a creep work speed.

Second pinion 14, keyed to mainshaft 10A, meshes with second gear 15 rotatable in countershaft cluster 6 with transfer pinion 16 on countershaft 11A.

Transfer pinion 16 meshes with transfer gear 17 rotatable on mainshaft 10A.

First and third pinion 20, rotatable on a sleeve 91 on mainshaft 10A, meshes constantly with first and third gear 21 keyed to countershaft 11A. Both the pinion 20 and the gear 21 are slidable axially when motivated by separate shift forks (not shown). The two shift forks are interconnected by suitable linkage to a single shift lever, outside, movable in a simple H pattern.

A reverse idler gear 76 is journalled on a lay shaft (not shown) secured in housing section 55S. Reverse pinion 22A, made part of mainshaft 10A meshes constantly with idler gear 76 which meshes constantly with reverse gear 23A, rotatable on countershaft 11A, to provide for the reverse speed.

Pinion 22A, idler 76 and gear 23A may be replaced by a sprocket gear and chain drive to provide the nonreversing drive within the scope of the present invention and both these nonreversing drives are hereafter regarded as equivalent to a "fourth gearset" or "fourth intermeshing gearset."

When first and third pinion 20 is moved to the left, a dog clutch 29 engages transfer gear 17 to establish a first speed drive of extreme ratio.

When pinion 20 is moved to the right, a dog clutch 30 engages reverse pinion 22A to establish a third speed drive.

When first and third gear 21 is moved to the left, a dog clutch 27 engages transfer pinion 16 to establish a second speed drive.

When gear 21 is moved to the right, a dog clutch 28 engages reverse gear 23A to establish a reverse speed drive.

The typically automotive differential 54 and axle shafts 53 are described with reference to FIG. 1. Countershaft 11A includes bevel pinion 51 meshing with bevel ring gear 52 secured to differential 54 to complete the drive.

Primary gear 44A includes a second bevelled face 92 to serve as the slow speed input member to a wet friction PTO cone clutch.

A fast PTO pinion 69, keyed to primary input shaft 40A, drives fast PTO gear 70 rotatable on PTO drive shaft 71.

A stamped steel fast speed PTO clutch input 75 is secured to gear 70 and has a bevelled face 66.

A sintered metal PTO clutch output 63 is keyed to and slidable axially on PTO drive shaft 71. Typically the fingers of a shift fork (not shown) will have antifriction rollers to engage groove 62. Said shift fork will be interconnected with a control lever outside.

When PTO clutch output 63 is held forceably to the right a bevelled face 65 contacts the bevelled face 66 of the input 75 to establish a fast PTO drive.

When PTO clutch output 63 is held forceably to the left a bevelled face 64 contacts the bevelled face 92 of the gear 44A to establish a slow PTO drive.

The PTO cone clutch has a large diameter to assure capacity at reasonable contact pressure. The outside control lever may utilize spring pressure and toggle action to assert this pressure.

The transmission clutch and the PTO clutch are readily serviced in the tractor chassis from the right.

Multiplate disc clutches may replace either or both clutches and employ manual or hydraulic engagement. Electromagnetic clutches are also applicable to the PTO within the scope of this invention.

PTO drive shaft 71 extends rearwardly to drive a PTO rear shaft 72 journalled rearwardly in housing section 55D and forwardly in a pilot bearing 102 at the junction with shaft 71. Shaft 72 ends outside with a category O rear PTO output RR. An axially slidable collar 73 is splined to shaft 72 and interconnected to an outside shift lever (not shown). When collar 73 is selectively motivated to the right, as drawn, like splines of shaft 71 are engaged to provide a drive to the output RR.

PTO drive shaft 71 extends forwardly to leave housing section 55P as forward PTO output P used to drive work tools mounted at the middle and front of the tractor as described with reference to FIG. 6.

Primary input shaft 40A includes a rearward portion 42 extending outside to drive a hydraulic system typically.

DESCRIPTION OF DRAWINGS SIX AND SEVEN

Figure 6:
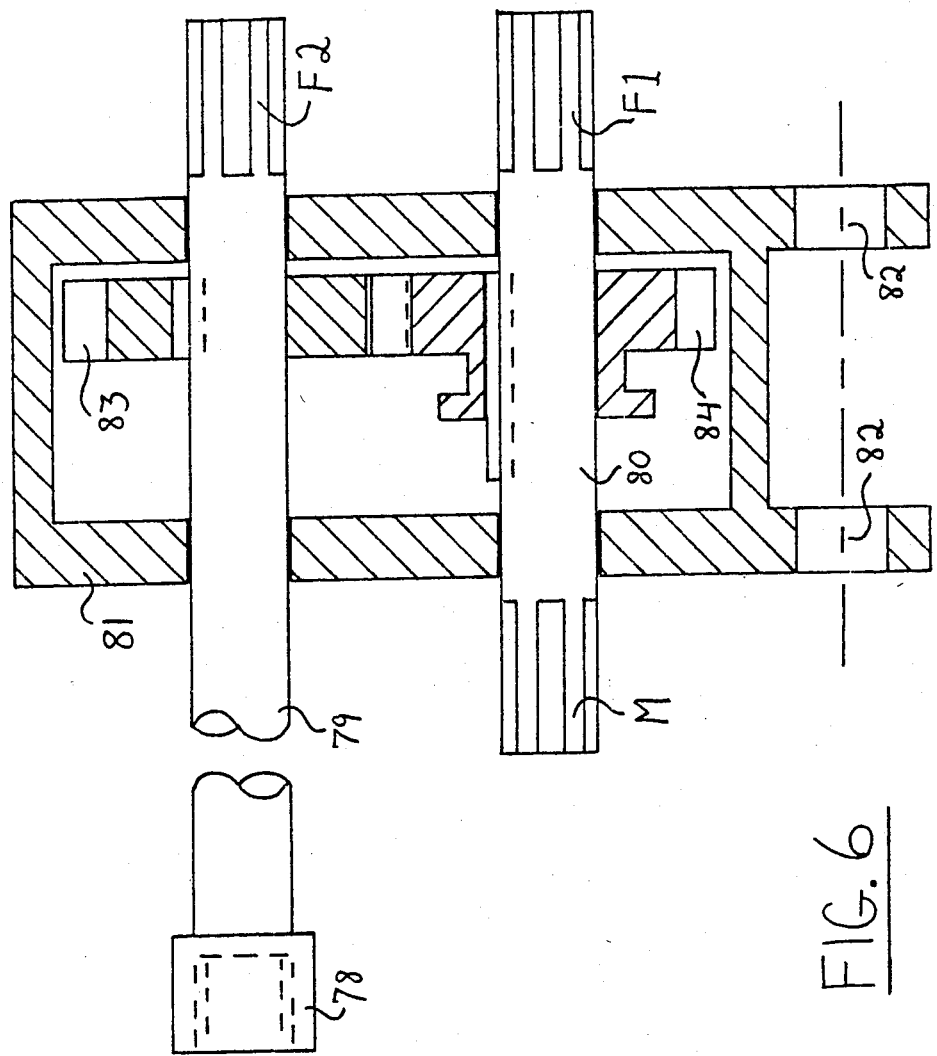
Figure 7:
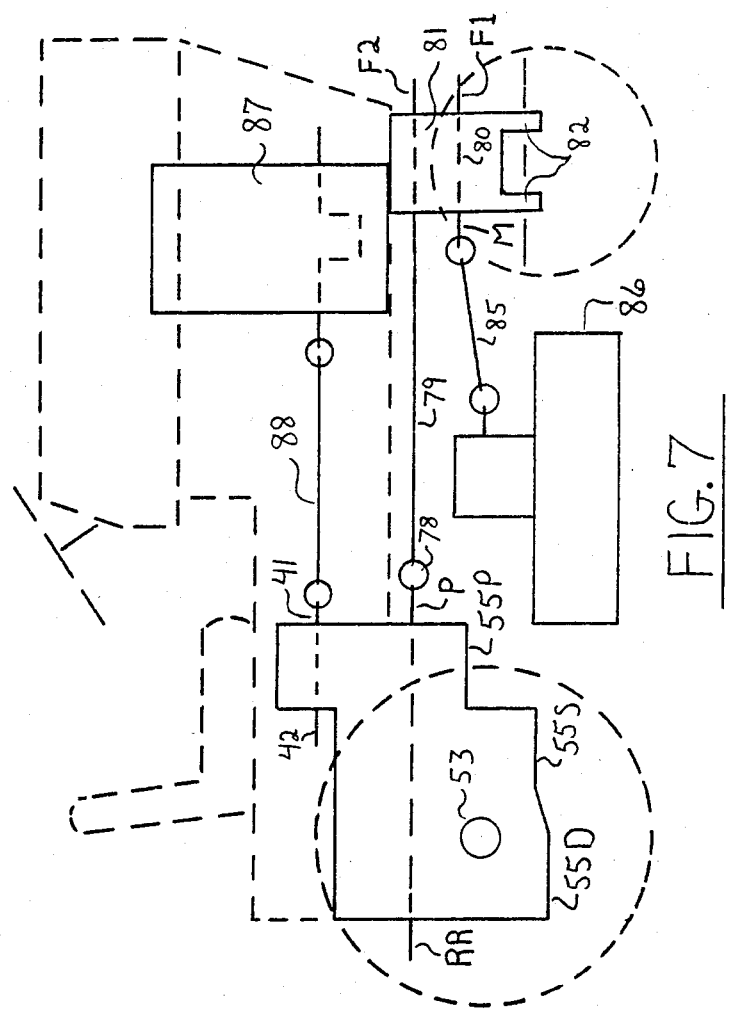
FIG. 7 is a somewhat schematic representation of a garden tractor outlined in broken lines. The transaxle of FIG. 2, the PTO transfer case of FIG. 6, the engine, mowing attachment and interconnecting shafts are shown also somewhat schematically using solid lines.

Referring to FIGS. 6 and 7 primarily, FIG. 6 shows a forward PTO transfer case 81 to complete the PTO system described with reference to FIG. 2. FIG. 7 shows a garden tractor in broken lines and the reference location of the components that comprise the invention.

Figure 3:
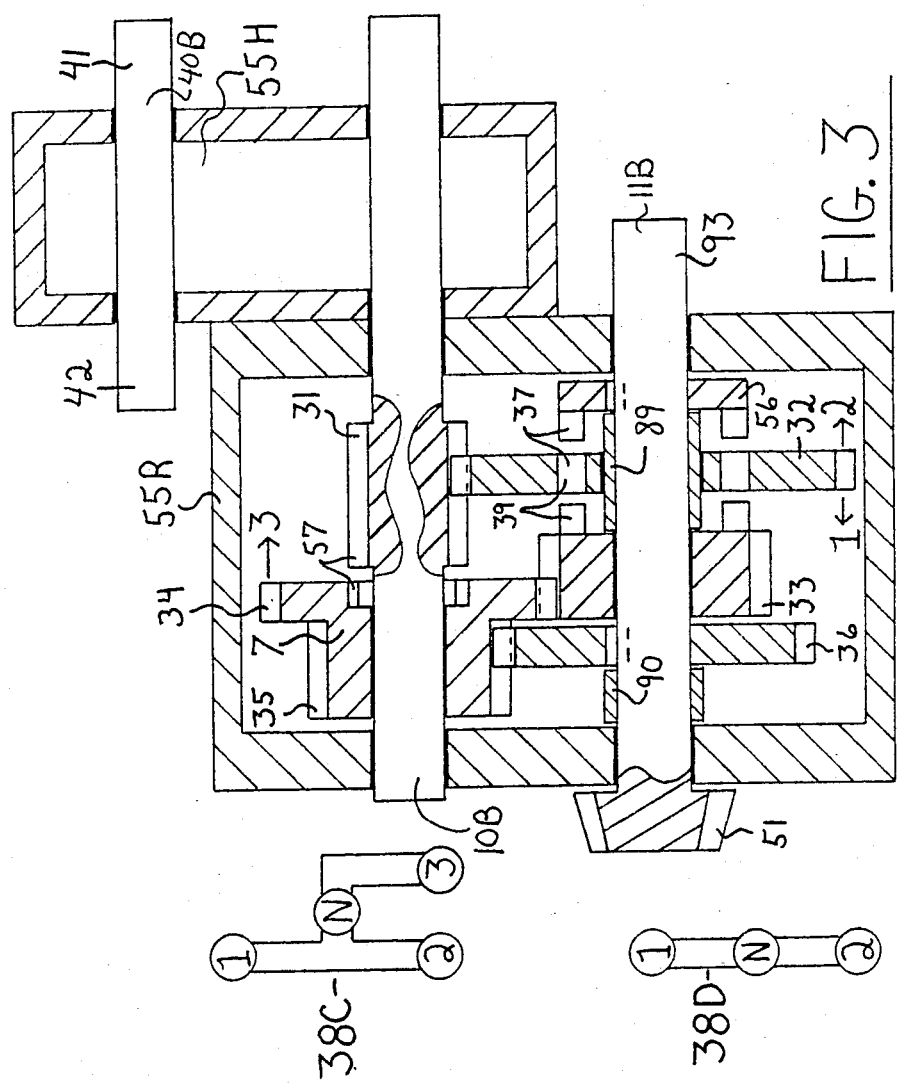

A drive shaft 88 interconnects the crankshaft of internal combustion engine 87 with the transaxle input 41 of FIGS. 1-3. The transaxle of FIG. 2 is shown comprised of sections 55P, 55S, 55D.

Referring to FIGS. 6 and 7, the PTO transfer case 81 serves as an enclosure housing and also provides a pivot mounting 82 for the tractor front axle. A forward PTO top shaft 79, journalled in case 81, includes a portion extending rearwardly outside and a coupling 78 interconnected with forward PTO output P (FIGS. 2 and 7) so that shaft 79 rotates with PTO drive shaft 71 (FIG. 2). Shaft 79 also includes a splined portion extending forwardly outside as PTO front output F2.

A PTO bottom shaft 80, journalled in case 81, includes a splined portion extending rearwardly outside as PTO middle output M. A mowing attachment 86 is shown with a drive shaft 85 interconnection to M. Shaft 80 also includes a splined portion extending forwardly outside as alternate PTO front output F1. A transfer case pinion 83, keyed to shaft 79, meshes with a transfer case gear 84 keyed to and slidable axially on shaft 80. A shift fork means (not shown) will selectively move gear 84 to the left and out of mesh with pinion 83 to disengage shaft 80 from shaft 79 so that the rear PTO output RR (FIG. 2) and front PTO output F2 may be employed while any work tool connected to outputs M and F1 remain in a neutral non-actuated state.

Likewise, the sliding shift collar 73 (FIG. 2) is used to disengage rear output RR so that outputs F1, F2, and M may be employed separately or together with output RR. Front outputs F1 and F2 rotate oppositely to provide greater PTO versatility. Either F1 or F2 may be deleted within the scope of this invention.

A nonreversing drive may replace the gearset 83, 84 or join gearset 83, 84 to provide a shiftable rotation direction of shaft 80.

The PTO outputs F1, F2, and M are driven at both slow and fast speeds as determined by the actuated state of the PTO cone clutch 63. The transfer case 81 may include an additional drive of a second ratio to provide a selectively shiftable two speed transfer case for even greater versatility at outputs M and F1.

The present invention, as described with reference to FIGS. 2, 6, and 7, shows a tractor featuring a rear PTO output RR, a PTO transfer case 81 to drive a middle PTO output M and front PTO outputs F1, F2 from the rear PTO system, a shift collar 73 to place the rear PTO output RR in neutral state and a transfer case 81 shift means to place front PTO output F1 and middle PTO output M in neutral state. A tractor so equipped is able to operate two mounted driven attachments separately or simultaneously such as a middle mower 86 and a rear blower collection system.

The front outputs F1, F2 are typically employed to drive a snow blower attachment or a front mower attachment.

DESCRIPTION OF DRAWING THREE

Referring to FIG. 3 primarily, This two or three speed gear range transmission 55R and variable, reversing hydrostatic transmission 55H are combined with the final drive differential section 55D of FIG. 1 to form a transaxle unit for a garden tractor.

A hydrostatic input shaft 40B, journalled in housing 55H, receives an unclutched input at 41 from an internal combustion engine 87 (FIG. 7). An output 42 provides a "live" source from which to drive a very same rear PTO system currently available and now shared with a gear drive transaxle FIG. 1.

The hydrostatic transmission, represented here only schematically, replaces the primary reduction clutch section 55P of FIG. 1 and is not a part of this invention.

A transmission input mainshaft 10B, journalled in housing section 55R, extends forwardly as the output shaft of hydrostatic transmission 55H and is further journalled therein.

A selectively variable and reversible drive is passed from shaft 40B to shaft 10B in a manner typical these hydrostatic transmissions.

Housing sections 55R and 55D (FIG. 1) share a common lubricating oil level which also serves as a hydraulic oil reservoir to hydro 55H.

A transmission output countershaft 11B is journalled in housing section 55R and includes a forward extension 93 outside to provide a drive source to a forward steering axle (not shown) to provide four wheel drive.

A drive is passed from shaft 10B to shaft 11B at a number of ratios to provide for three speeds with one being of extreme reduction ratio.

Shaft 10B includes second pinion 31 meshing with second gear 32 slidable axially and rotatable on a sleeve 89 on countershaft 11B. Transfer pinion 33, rotatable on countershaft 11B, meshes with transfer gear 34 slidable axially and rotatable in cluster 7 with third pinion 35 on mainshaft 10B. Third pinion 35 meshes with third gear 36 keyed to countershaft 11B.

Both the gear 32 and cluster 7 are slidable axially when motivated by separate shift forks (not shown).

The two shift forks are interconnected by suitable linkage to an outside shift lever movable in the H shift pattern 38C.

An output flange 56 is keyed to countershaft 11B. When gear 32 is moved to the left, a dog clutch 39 engages pinion 33 to establish a first speed drive of extreme reduction. When gear 32 is moved to the right, a dog clutch 37 engages flange 56 to establish a second speed. When cluster 7 is moved to the right a dog clutch 57 engages pinion 31 to establish a third speed. A safety neutral state exists as drawn.

There are no snap rings on any torqued section of shafts 10B and 11B as grooves would produce stress concentrations. Spacer 90 and sleeve 89 position the gears on the countershaft 11B.

Countershaft 11B includes a bevel output pinion 51 to drive the very same final drive differential section 55D described with reference to FIG. 1

The transaxle of FIG. 3 readily provides the following travel speeds at full engine speed.

FIRST: 0–2 mph
SECOND: 0–6.2 mph
THIRD: 0–10.6 mph

A turf truckster with tractor mode may readily employ the transaxle FIG. 3 with a faster third speed ratio. Increased reduction ratio of gearset (33, 34) will retain the creep first speed ratio.

The creep first speed will greatly enhance tractor performance when performing such tasks as snow blowing and rototilling.

Currently a typical hydro garden tractor employs only the gearset (31, 32) to provide only the second 0–6.2 mph work speed. Some current hydro tractors employ a second gearset as (35, 36) to provide a high transport speed range additionally. Typically these transport speeds approximate the 0–10.6 mph speed suggested herewith.

The range transmission 55R presented provides three speeds to effectively cover a ratio range of factor five. Increased reduction of gearset (33, 34) will expand this factor to nine for a special "super creep" first speed.

A range transmission as currently produced could employ three gearsets to provide three speed drives between two shafts to cover a ratio range of factor five or perhaps even seven. However, design limitations would require quite small pinions for the lowest speed, with inherent weakness, and a considerable speed increasing ratio for the fast speed requiring further reduction elsewhere in a transaxle. The simple sliding gear shift means disclosed herewith could not be employed with the desirable constant mesh feature of the present invention.

As shown in FIG. 3, all gearsets selected have reduction ratios so that the range transmission 55R replaces a currently required reduction gearset as (31, 32). The first speed ratio is the product of ratios of all three gearsets (31, 32), (33, 34), (35, 36). No ratio compromises are made since gearset (33, 34) is selected to establish the desired product after the desired second and third speed ratios are established. Second speed requires the greatest single reduction; therefore a shaft 10B integral pinion 31 is employed. Such is the case with all transmissions described by the invention.

Gearset (31, 32) is never asked to transmit a multiplied torque so that gearset (31, 32) may have diametric pitch (12 D.P. typically) greater than that of gearsets (33, 34) and (35, 36) (8 D.P. typically). The twelve and eight pitches share many common shaft center distances.

The economy and simplicity of construction are apparent. Just three spur gearsets provide for three speed drives despite the fact that the low speed requires three gearsets in its train. The constant mesh shift means is comprised of the gears themselves and also provides for a safety neutral. The mainshaft 10B and countershaft 11B also serve as idler shafts and require no splining or special machining. The mainshaft 10B is obtained by merely including a plain rearward extension to a currently produced hydro output shaft. Currently employed pinion 31 may require increased face.

A two speed range transmission 55R requires only one axially sliding element, gear 32. The dog clutch 57 and portion of the shift motivation means that would engage the third speed are deleted. Cluster 7 would be axially fixed and pinions 33 and 35 would require reduced face. A shift lever would be movable in the simple line pattern 38D shown.

The two speed transmission as outlined above provides an economically attractive means to feature a more desirable and safe second speed range in a small tractor.

Wherein the second speed is a more advantageous slow work speed as opposed to a fast transport speed of limited value and substantial liability concern. Two speed models may employ maximum reduction ratios for gearsets (33, 34) and (35, 36) for extremely large overall first speed reduction for very special applications such as trenching or commercial rototilling to provide speed ranges as follows:
FIRST: 0-0.8 mph
SECOND: 0-6.2 mph A two speed transaxle for a hydro tractor intended for both mowing and heavy application as snow blowing and rototilling might utilize spur gearset ratios selected to provide speed ranges as follows:
FIRST: 0-2 mph
SECOND: 0-6.2 mph And a like tractor intended primarily for mowing and hauling and only occasional heavy applications might utilize gearing selected to provide speed ranges as follows in a somewhat smaller housing 55R:
FIRST: 0-4 mph
SECOND: 0-8 mph This last example provides mowing speeds in the low speed range especially desirable in hilly terrain as explained below.

A hydrostatic transmission theoretically provides an infinite range of output/input ratios from 0:1 to 1:1. Unlike other forms of speed reduction, the maximum output torque is limited to the preset system relief pressure. For this reason and other inherent characteristics, a hydrostatic transmission provides a much smaller "controlled" speed range than the stated theoretical value. And while these transmissions provide an exploitable measure of speed reduction, this reduction is not accompanied by a proportionate torque multiplication. Considerable heat is generated by increased hydraulic pressure as torque loads increase.

The hydro becomes a more positive, controllable and efficient drive as the control lever is advanced further into its range and as torque loads are decreased at the hydro output.

Maximum gear reduction, after the hydro and compatible with a given task, will reduce these torque loads at the hydro output.

When these hydro tractors lacking slow speed gearing are assigned creep speed tasks such as rototilling or snow blowing, the performance is often unacceptable especially when draft loads vary or switch from positive to negative. These tractors tend to stall and run away in response to these difficult drafts. Safe and efficient operation requires a skilled operator willing to continually adjust the control lever carefully.

A hydro tractor featuring increased gear reduction in a mowing speed range would better hold a desired set speed as draft loads varied or switched from positive to negative as when mowing in hilly terrain. The operator would not be required to continually modulate the hydro control lever to maintain a desired speed when the hydro transmission was operating in a near fully or more fully advanced state.

The greatest possible gear reduction that is practical with the intended applications of the tractor will provide the greatest efficiency, performance, safety and control. The present invention provides the reduction in two or three speed ranges to exploit the maximum advantages of these hydrostatic transmissions in a garden tractor. When high reduction final drive ratios are selected, as typified by worm or hypoid gearing, the new transmission may provide a creep speed as well as a second work speed in place of the transport speed so that every task normally associated with these tractors will have a speed range to maximize performance and efficiency. Double reduction final drives, as typically employed with compact tractors also provides the increased final reduction to transform the transport speed into a work speed.

These presently disclosed transmissions are also applicable to larger tractors and trucks as well. Hydraulic clutch packs, each selectively energized separately would provide power shift clutched speeds and are considered "clutch means shiftable" within the scope of this invention.

These disclosed transmissions are not limited to mechanical and hydrostatic input. Simple hydraulic and electric driven machinery can realize increased control and wheel torque over a wide range of ratios due to the considerable reduction available within the scope of the present invention.

DESCRIPTION OF DRAWING FOUR

Referring to FIG. 4 primarily, This five speed and slow reverse transmission is exactly as the speed transmission section 55S described with reference to FIG. 1 except that the reverse speed drive (12, 13) has been repositioned, as detailed below, to increase the overall reduction of the reverse speed drive.

The transmission of FIG. 4 may be employed in place of the transmission 55S (FIG. 1) to provide for a slower and thus safer reverse speed. However, the FIG. 4 transmission will be described with application reference to an ATV cycle designed to serve also in a tractor mode.

Reverse drive sprocket 12 is now free of mainshaft 10 and rotates in cluster with transfer gear 17 and first pinion 18 on mainshaft 10. The members 12, 17, and 18 are now separate components or a weldment unit. As drawn, cluster members 12 and 18 are splined to a hub portion 98 of gear 17 to comprise the cluster as apparent to those in the art.

Now when pinion 20 is moved to the left, a dog clutch 29 engages gear 17 at 99 to establish the second speed drive.

The function of sliding shift collar 24 is unchanged from that described with reference to FIG. 1 except that axial direction is altered as follows.

Now when collar 24 is moved to the right, a dog clutch 25 engages drive sprocket 13 to establish a slow reverse speed drive. And when collar 24 is moved to the left, a dog clutch 26 engages pinion 16 to establish the third speed drive.

It might be noted that just six drive sets are required to provide six speed drives in a single range despite the fact that three speed drives now require three drive sets each in their trains. Also noteworthy is the simplicity of the shift means.

Again, all numbers followed by T indicate numbers of gear teeth and no speed increasing drives are employed so that needed costly reduction elsewhere in a vehicle may be reduced. The arrangements of gears on shafts 10 and 11 of this FIG. 4 are such that each sliding shift element engages two speed drives that compliment a shift sequence and shift fork motivation means described as follows.

Three shift forks, described with reference to FIG. 1, are now motivated by a typically motorcycle gearshift means comprised of a shift drum journalled inside the transmission housing and caused to rotate by selective sequential movements of an outside foot shift lever in typical motorcycle fashion. It is well known that this drum includes three cam grooves in an outside diameter to actually motivate the three shift forks in programmed sequence as the drum is rotated.

The shift sequence is 5-4-3-2-N-1-R. A first and reverse lock out permits safe operation of the ATV cycle as a sport vehicle. The lock out consists of a spring loaded, electromagnetically retractable pin that enters a radial groove in the shift drum. The groove allows unrestricted drum rotation from the neutral to fifth speed positions. The operator will push a convenient momentary switch to energize the electromagnet to retract the pin from the groove so that forward movements of the shift lever engages first and then reverse speeds. The operator may then shuttle between first and reverse without depressing the switch. When the operator shifts up to neutral, the spring loaded pin will again enter the aligned groove so that first and reverse cannot be reengaged without first depressing the switch.

The following gear ratios and ATV speeds are provided. Overdrive gearing for the fast speeds may be employed to expand the range of ratios.

| FIFTH | 1:1 | 41 mph max. |
| --- | --- | --- |
| FOURTH | 1.36:1 | 30 mph max. |
| THIRD | 2.06:1 | 20 mph max. |
| SECOND | 4.94:1 | 8.3 mph max. |
| FIRST | 12.20:1 | 3.4 mph max. |
| REVERSE | 9.88:1 | 4.1 mph max. |

The first speed is used with a snow blade, draft tillage tools and mowers typically. These mowers need not include a separate powering engine as a PTO drive is now practical from the ATV engine. The second speed is used with a mower in less demanding conditions with the ATV engine operating at part speed (about 4 mph). An electric engine speed governor will hold a tractor mode speed.

The transmission of FIG. 4 may be mounted transversely in the cycle engine crankcase in typical motorcycle fashion. (Referring now to FIG. 1 also) An ATV cycle intended primarily for utility service might employ the transmission FIG. 4 longitudinally in a transaxle similar to that of FIG. 1. The cycle engine might then share a housing with primary reduction clutch housing 55P, wherein primary input shaft 40 becomes an extension of the cycle engine crankshaft. Longitudinal disposure also makes four wheel drive from a forward portion of countershaft 11 practical.

The rear PTO system as currently employed with some hydrostatic garden tractors and as now available with the gear drive transaxle of FIG. 1 may be employed on an ATV cycle to drive rear mounted work tools. A drop box and shaft arrangement will drive front mounted attachments from the rear PTO output as RR FIG. 2. An alternate separately engageable front PTO output may be electromagnetically clutched and driven from the now longitudinally disposed cycle engine crankshaft.

An ATV cycle featuring the slow first work speed of the transmission FIG. 4 may even be used with auxiliary powered snow blower and rototiller attachment. Part throttle operation of the ATV in first provides positive high torque speed less than one mph.

A more utility aimed ATV would also include a two speed range transmission as described with reference to FIG. 3. The combination of speed transmissions would readily provide for a ten speed ATV with a low range first maximum speed of 0.6 mph so that even rototiller and snow blower attachments might be driven by a PTO system.

The applications of an ATV with tractor mode and PTO system are many. Any work tool designated ASAE category O may be driven by the ATV.

DESCRIPTION OF DRAWING FIVE

Figure 5:
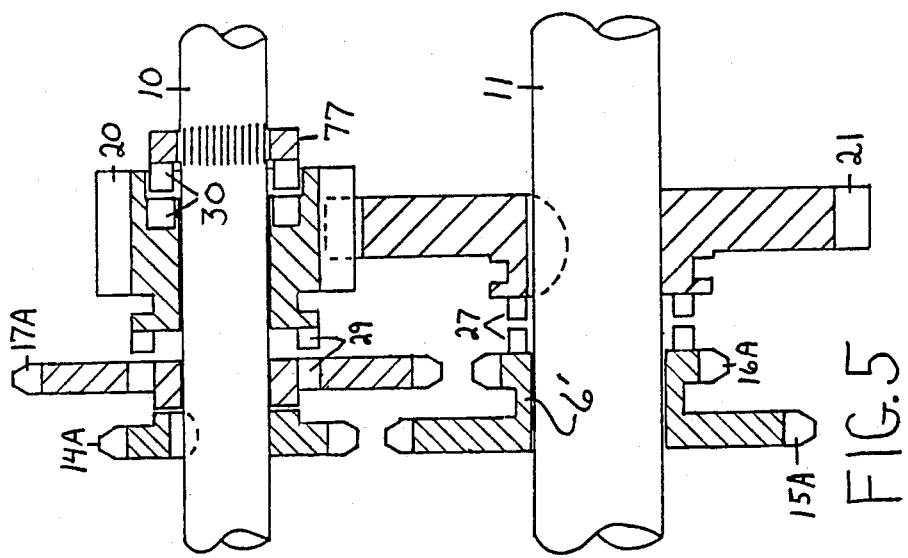

Referring to FIG. 5, This two speed and reverse transmission represents the invention by way of a final example. A drive is again passed from an input mainshaft 10 to an output countershaft 11 wherein a low speed features extreme reduction ratio. This FIG. 5 transmission will serve as a range transmission for small powered equipment such as a rear tine rototiller and may also serve as an auxiliary transmission to a small tractor or ATV.

Reverse drive sprocket 14A, keyed to mainshaft 10, drives reverse driven sprocket 15A rotatable in cluster 6' with transfer drive sprocket 16A on countershaft 11 with a chain (not shown).

Transfer drive sprocket 16A drives transfer driven sprocket 17A rotatable on mainshaft 10 with a second chain (not shown). First and second pinion 20, rotatable and axially slidable on mainshaft 10, meshes with first and second gear 21, keyed to and axially slidable on countershaft 11. An input flange 77 is nonrotatable on mainshaft 10.

Sliding elements 20 and 21 are motivated as described with reference to FIG. 1. When pinion 20 is moved to the left a dog clutch 29 engages transfer driven sprocket 17A to establish a first speed drive of extreme reduction ratio.

When pinion 20 is moved to the right, a dog clutch 30 engages output flange 77 to establish a second speed drive.

When gear 21 is moved to the left, a dog clutch 27 engages cluster 6' to establish a reverse speed drive.

The sprocket sets (14A, 15A) and (16A, 17A) are considered equivalent to gearsets (14, 15) and (16, 17) of FIGS. 1, 2, and 4 within the scope of the present invention and will be hereafter referred to as "gearsets" or "intermeshing gearsets" so that the new invention may be defined in a more clear manner.

It will now be seen that the invention provides in the illustrated embodiments speed and range transmissions advantageously applied to gear and hydrostatic drive garden tractors and ATV cycles.

Shown are an unique creep speed drive train, a simplified shift means, and PTO advancements that exploit the full advantage of a rear PTO system.

While there have been described above the principles of this invention in connection with specific apparatus it is to be understood that this description is made only by way of example and not as a limitation to the scope of the invention.

We claim:

1. A tractor power transmission comprised of; a speed transmission housing, a first transmission shaft (40A) journalled in said housing, a hollow second transmission shaft (10A) journalled in said housing generally below and parallel to said first transmission shaft, a PTO drive shaft (71) journalled in said housing and passing axially within said second transmission shaft and protruding forward and rearward from said second transmission shaft, a third transmission shaft (11A) journalled in said housing parallel to said second transmission shaft, a final drive differential journalled in said housing perpendicular to said third transmission shaft, a coaxial rearward extension shaft (72) to said PTO drive shaft journalled in said housing to provide a rear PTO drive, gear means to drivingly connect said second and said third transmission shafts, gear means to drivingly connect said third transmission shaft and said final drive differential, a first set of intermeshing gears on said first and said second transmission shafts to drivingly connect said first and said second transmission shafts, a second set of intermeshing gears on said first transmission shaft and said PTO drive shaft PTO clutch means shiftable to drivingly connect said first transmission shaft and said PTO drive shaft through said second set of intermeshing gears at a first speed ratio when said PTO clutch means are in a first actuated state, said PTO clutch means shiftable to drivingly connect said first transmission shaft and said PTO drive shaft through said first set of intermeshing gears at a second speed ratio when said PTO clutch means are in a second actuated state and while said first set of intermeshing gears continues to provide a line of drive from said first transmission shaft to said second transmission shaft.

2. A power transmission comprising; a transmission support and enclosure housing, an input mainshaft (10B) journalled in said housing, an output countershaft (11B) journalled in said housing parallel to said mainshaft, a first meshing gearset on said shafts comprised of a first pinion (31) nonrotatable on said mainshaft and a first gear (32) rotatable on said countershaft, a second meshing gearset on said shafts comprised of a second pinion (33) rotatable on said countershaft and a second gear (34) nonrotatable on said mainshaft, a third meshing gearset on said shafts comprised of a third gear (36) nonrotatable on said countershaft and a third pinion (35) rotatable on said mainshaft, said third pinion forming a cluster gear with said second gear, said second meshing gearset being disposed between said first and said third gearsets, first clutch means shiftable to selectively drivingly connect said first gear to said second pinion and to said countershaft one at a time to establish a first and a second speed drive at respective reduction ratio between said shafts, said first speed drive having said reduction ratio equal to the multiplicative product of said first, said second and said third meshing gearset ratios, said second speed drive having said reduction ratio equal to said first gearset ratio.

3. The power transmission of claim 2 further comprised of; second clutch means shiftable to selectively drivingly connect said cluster gear to said mainshaft only when said first clutch means are in a non-actuated state to establish a third speed drive between said shafts at a third speed ratio equal to said third gearset ratio.

4. A power transmission comprising; a transmission support and enclosure housing, an input mainshaft (10) journalled in said housing, an output countershaft (11) journalled in said housing parallel to said mainshaft, a first meshing gearset on said shafts comprised of a first pinion (14) nonrotatable on said mainshaft and a first gear (15) rotatable on said countershaft, a second meshing gearset on said shafts comprised of a second gear (17) rotatable on said mainshaft and a second pinion (16) rotatable on said countershaft, said second pinion forming a cluster gear with said first gear, a third meshing gearset on said shafts comprised of a third pinion (20) rotatable on said mainshaft and a third gear (21) nonrotatable on said countershaft, said second gearset being disposed between said first and said third gearsets, first clutch means shiftable to drivingly connect said second gear (17) and said third pinion (20) to establish a first speed drive at a first speed ratio between said shafts, second clutch means shiftable to drivingly connect said third pinion (20) and said mainshaft only when said first clutch means are in a non-actuated state to establish a second speed drive at a second speed ratio between said shafts, said first speed ratio equal to the multiplicative product of said first said second and said third meshing gearsets ratio, said second speed ratio equal to said third meshing gearset ratio.

5. The power transmission of claim 4 further comprised of; third clutch means shiftable to drivingly connect said cluster gear and said countershaft only when said first and said second clutch means are in a nonactuated state to establish a third speed drive at a third speed ratio between said shafts, said third speed ratio equal to said first meshing gearset ratio.

6. The power transmission of claim 5 further comprised of; a fourth meshing gearset on said shafts comprising a fourth pinion (22) nonrotatable on said mainshaft and a fourth gear (23) rotatable on said countershaft, said third meshing gearset being disposed between said second and said fourth meshing gearsets, wherein said clutch means are selectively shiftable dog clutch means, said third pinion being slidable in an axial direction toward said second gear to be dog clutch drivingly connected to said second gear to establish said first speed drive, said third pinion being slidable in an axial direction toward said fourth pinion to be dog clutch drivingly connected to said fourth pinion to establish said third speed drive, said third gear being slidable in an axial direction toward said fourth gear to be dog clutch drivingly connected to said fourth gear to establish a fourth speed drive at a fourth speed ratio between said shafts, said fourth speed ratio being equal to said fourth meshing gearset ratio, wherein said dog clutch means are so adapted that only one said speed drive may be established at a time.

7. The transmission of claim 6 wherein said third gear is slidable axially toward said cluster gear to be dog clutch drivingly connected to said cluster gear to establish said second speed drive.

8. The transmission of claim 6 further comprised of; a fifth meshing gearset on said shafts comprising a fifth pinion (18) rotatable in cluster with said second gear (17) on said mainshaft and a fifth gear (19) rotatable on said countershaft, said fifth meshing gearset being disposed between said second and said third meshing gearsets, wherein said third gear (21) is slidable axially toward said fifth gear to be dog clutch drivingly connected to said fifth gear to establish a fifth speed drive at a fifth speed ratio between said shafts, said fifth speed ratio being equal to the multiplicative product of said first and said second and said fifth meshing gearset ratios.

9. The transmission of claim 6 further comprised of; a nonreversing drive on said shafts to provide for a reverse speed drive, said nonreversing drive having a toothed driver element (12) rotatable in cluster with said second gear (17) on said mainshaft and a toothed driven element (13) on said countershaft, said transmission further comprised of selective shift means to establish said nonreversing drive only when said first, said second, said third and said fourth speed drives are in a nonactuated state, said reverse speed drive having a speed reduction ratio equal to the multiplicative product of said first and said second meshing gearset ratios and said nonreversing drive ratio.

10. A tractor power transmission comprised of; a transmission housing disposed at a rearward portion of said tractor, a primary shaft (40A) journalled in said housing, a hollow mainshaft (10A) journalled in said housing generally below and parallel to said primary shaft, a countershaft (11A) journalled in said housing parallel to said mainshaft, a final drive differential (54) journalled in said housing perpendicular to said countershaft, gear means to drivingly connect said primary shaft and said mainshaft, gear means to drivingly connect said mainshaft and said countershaft, gear means to drivingly connect said countershaft and said final drive differential, a PTO drive shaft (71) journalled in said housing and passing axially within said hollow mainshaft and protruding forwardly and rearwardly from within said mainshaft, a coaxial rearward extension (72) to said PTO drive shaft journalled in said housing and leaving said housing rearwardly to provide a rear PTO output (RR) to power work tools mounted generally at the rear of said tractor, a coaxial forward extension to said PTO drive shaft journalled in said housing and leaving said housing forwardly to provide a forward PTO output (P), gear means to drivingly connect said primary shaft and said PTO drive shaft, a forward PTO case (81) disposed at a forward portion of said tractor, a forward PTO top shaft (79) journalled in said forward PTO case parallel to said PTO drive shaft and leaving said forward PTO case rearwardly to interconnect with and be driven by said forward PTO output, a forward PTO bottom shaft (80) journalled in said forward PTO case parallel to and generally below said forward PTO top shaft, gear means to drivingly connect said forward PTO top shaft and said forward PTO bottom shaft, a rearward extension to said PTO bottom shaft protruding rearwardly from said forward PTO case to provide a middle PTO output (M) to power work tools mounted generally at the middle of said tractor, at least one forward shaft extension protruding forwardly from said forward PTO case to provide a front PTO output (F1, F2) to power work tools mounted generally at the front of said tractor.

* * * * *